United States Patent
Liu

(10) Patent No.: US 10,813,156 B2
(45) Date of Patent: Oct. 20, 2020

(54) METHOD AND APPARATUS FOR PROCESSING NETWORK CONNECTION

(71) Applicant: ZTE CORPORATION, Guangdong (CN)

(72) Inventor: Yikang Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 56 days.

(21) Appl. No.: 15/580,951

(22) PCT Filed: Nov. 17, 2015

(86) PCT No.: PCT/CN2015/094834
§ 371 (c)(1),
(2) Date: Dec. 8, 2017

(87) PCT Pub. No.: WO2016/197544
PCT Pub. Date: Dec. 15, 2016

(65) Prior Publication Data
US 2018/0176976 A1    Jun. 21, 2018

(30) Foreign Application Priority Data
Jun. 10, 2015  (CN) .......................... 2015 1 0317181

(51) Int. Cl.
*H04W 76/18* (2018.01)
*H04W 76/10* (2018.01)
(Continued)

(52) U.S. Cl.
CPC .......... *H04W 76/18* (2018.02); *H04W 8/183* (2013.01); *H04W 8/205* (2013.01); *H04W 76/10* (2018.02); *H04W 76/30* (2018.02); *H04W 8/245* (2013.01)

(58) Field of Classification Search
None
See application file for complete search history.

(56) References Cited

U.S. PATENT DOCUMENTS

| 2013/0109436 A1* | 5/2013 | Tat | ......................... | H04W 8/183 |
| | | | | 455/558 |
| 2013/0303139 A1* | 11/2013 | Helfre | ..................... | H04W 4/16 |
| | | | | 455/417 |

(Continued)

FOREIGN PATENT DOCUMENTS

| CN | 102056135 A | 5/2011 |
| CN | 103781046 A | 5/2014 |

(Continued)

OTHER PUBLICATIONS

International Search Report dated Mar. 15, 2016 issued in PCT/CN2015/094834.

(Continued)

*Primary Examiner* — Thomas J Dailey
(74) *Attorney, Agent, or Firm* — Cantor Colburn LLP

(57) ABSTRACT

Provided are a method and apparatus for processing a network connection. The method comprises the following steps: after a first communication module establishes a first connection with a network, a second communication module receives an instruction message sent by the first communication module within a pre-determined time (S102), wherein the instruction message is used for instructing the second communication module to disconnect a second connection established with the network; and the first communication module being connected to a first subscriber identity module (SIM) card in a terminal, and the second communication module being connected to a second SIM card in the terminal (S104). The present invention realizes automatic verification of the connection availability of the virtual SIM card without manual involvement of a user, and thus improves the user experience.

14 Claims, 3 Drawing Sheets

(51) Int. Cl.
    *H04W 76/30*     (2018.01)
    *H04W 8/18*     (2009.01)
    *H04W 8/20*     (2009.01)
    *H04W 8/24*     (2009.01)

(56) References Cited

U.S. PATENT DOCUMENTS

| | | |
|---|---|---|
| 2013/0329639 A1 | 12/2013 | Wietfeldt et al. |
| 2014/0220981 A1* | 8/2014 | Jheng ................ H04W 36/0011 |
| | | 455/437 |
| 2015/0099562 A1* | 4/2015 | Xiong .................. H04W 8/183 |
| | | 455/558 |
| 2016/0037329 A1* | 2/2016 | Chong ................. H04W 76/10 |
| | | 455/422.1 |
| 2016/0050556 A1* | 2/2016 | Zhao ...................... H04W 8/20 |
| | | 455/432.1 |

FOREIGN PATENT DOCUMENTS

| | | |
|---|---|---|
| CN | 103987025 A | 8/2014 |
| CN | 104185171 A | 12/2014 |
| CN | 104380773 A | 2/2015 |
| CN | 104394522 A | 3/2015 |
| WO | 99/62282 A1 | 12/1999 |
| WO | 2014/048130 A1 | 4/2014 |
| WO | WO 2014/071725 A1 | 5/2014 |
| WO | 2014/180324 A1 | 11/2014 |

OTHER PUBLICATIONS

Extended Supplementary European Search Report dated Mar. 5, 2018 received in European Patent Application No. 15 89 4800.0.

\* cited by examiner

METHOD AND APPARATUS FOR PROCESSING NETWORK CONNECTION

CROSS REFERENCE TO RELATED APPLICATION

The present application is the national phase of International Application No. PCT/CN2015/094834, filed on Nov. 17, 2015 and claims priority to Chinese Patent Application No. 201510317181.5, filed on Jun. 10, 2015, and the entire contents thereof are incorporated herein by reference.

TECHNICAL FIELD

The present disclosure relates to the field of communications, and in particular, to a method and apparatus for processing a network connection.

BACKGROUND

When a pre-research project concerning a virtual Subscriber Identity Module (SIM) card is carried out, there is a need to use a real SIM card first to establish a connection to acquire virtual SIM card information, and then a virtual SIM card is used to establish a dial-up connection for users to access the Internet. The current implementation of a dual-chip solution is to disconnect a real SIM card connection first and then establish a virtual SIM card connection or disconnect the real SIM card connection after the acquired IP address is successfully returned through the virtual SIM card dial-up connection.

In the related art, regardless whether a single-chip solution or a dual-chip solution is adopted, the processes to complete the acquisition of the virtual SIM card information and the dialing are similar. A real SIM card is first used to establish a network connection; next, virtual SIM card information is acquired; then, the real SIM card connection is disconnected; thereafter the virtual SIM card information is used to establish a network connection; and then data communication is performed. Wherein, the real SIM card connection may also be disconnected after an Internet Protocol (IP) address has been acquired through the virtual SIM connection.

In an implementation of the related technical solution, to disconnect the connection established by using the real SIM card after the virtual SIM card information has been acquired, or to disconnect the connection established by using the real SIM card after a IP address assigned by network has been acquired by using the virtual SIM card dial-up connection, does not consider abnormalities that may occur during the establishment of the virtual SIM card connection. Thus, if there is a problem in establishing a network connection by using the virtual SIM card information and the connection cannot be established, or if there is a problem in the data communication process after the connection has been established and the data path does not work, the terminal cannot automatically determine and the user needs to manually determine the fault and restart the terminal to reestablish a real SIM card dial-up connection, which takes a long time. The repetitive disconnection and networking operations will increase the user's latency, leading to bad user experience.

In the related art, no effective solution has been proposed for solving the problem that during the establishment of a virtual SIM card network connection, the connection cannot be established, or data communication cannot be performed after the connection has been established.

This section provides background information related to the present disclosure which is not necessarily prior art.

SUMMARY

Provided in the embodiments of the present disclosure are a method and apparatus for processing a network connection, to at least solve the problem in the related art that during the establishment of a virtual SIM card network connection, the connection cannot be established, or data communication cannot be performed after the connection has been established.

According to an aspect of the embodiments of the present disclosure, there is provided a method for processing a network connection, comprising: after a first communication module establishes a first connection with a network, a second communication module receiving, within a pre-determined time, an instruction message sent by the first communication module, wherein the instruction message is used to instruct the second communication module to disconnect a second connection established with the network; the first communication module being connected to a first subscriber identity module (SIM) card in a terminal, and the second communication module being connected to a second SIM card in the terminal; and the second communication module disconnecting the second connection.

Alternatively, the second communication module receiving within the pre-determined time the instruction message sent by the first communication module comprises: the second communication module receiving within the pre-determined time the instruction message which arrives after being transmitted via the first connection and the second connection sequentially.

Alternatively, the instruction message carries the destination address of the instruction message, wherein, the destination address of the instruction message is the network protocol (IP) address of the second connection established by the second communication module.

Alternatively, the method further comprises: if the second communication module does not receive, within the pre-determined time, the instruction message sent by the first communication module, the second communication module maintaining the second connection.

Alternatively, the first SIM card is a virtual SIM card; and the second SIM card is a virtual SIM card or a real SIM card.

According to another aspect of the embodiments of the present disclosure, there is further provided another method for processing a network connection, comprising: a first communication module establishing a first connection with a network; the first communication module sending an instruction message to a second communication module, wherein the instruction message is used to instruct the second communication module to disconnect a second connection established with the network, the first communication module is connected to a first subscriber identity module (SIM) card in a terminal, and the second communication module is connected to a second SIM card in the terminal.

Alternatively, the first communication module sending the instruction message to the second communication module comprises: the first communication module sending the instruction message to the second communication module via the first connection and the second connection sequentially.

Alternatively, the instruction message carries the destination address of the instruction message, wherein, the destination address of the instruction message is the network protocol (IP) address of the second connection established by the second communication module.

Alternatively, the first SIM card is a virtual SIM card; and the second SIM card is a virtual SIM card or a real SIM card.

According to an aspect of the embodiments of the present disclosure, there is provided an apparatus for processing a network connection, comprising: a processor; and a memory for storing instructions executable by the processor; wherein the processor is configured to: receive, within a pre-determined time, after a first communication module establishes a first connection with a network, an instruction message sent by the first communication module, wherein the instruction message is used to instruct the second communication module to disconnect a second connection established with the network; the first communication module being connected to a first subscriber identity module (SIM) card in a terminal, and the second communication module being connected to a second SIM card in the terminal; and to disconnect the second connection.

Alternatively, the processor is further configured to receive, within the pre-determined time, the instruction message which arrives after being transmitted via the first connection and the second connection sequentially.

Alternatively, the instruction message carries the destination address of the instruction message, wherein, the destination address of the instruction message is the network protocol (IP) address of the second connection established by the second communication module.

Alternatively, the processor is further configured to: maintain the second connection if the instruction message sent by the first communication module has not been received within the pre-determined time.

Alternatively, the first SIM card is a virtual SIM card; and the second SIM card is a virtual SIM card or a real SIM card.

According to another aspect of the embodiments of the present disclosure, there is further provided another apparatus for processing a network connection, comprising: a processor; and a memory for storing instructions executable by the processor; wherein the processor is configured to: establish a first connection with a network; a sending module configured to send an instruction message to a second communication module, wherein the instruction message is used to instruct the second communication module to disconnect a second connection established with the network, the first communication module is connected to a first subscriber identity module (SIM) card in a terminal, and the second communication module is connected to a second SIM card in the terminal.

Alternatively, the processor is further configured to send the instruction message to the second communication module via the first connection and the second connection sequentially.

Alternatively, the instruction message carries the destination address of the instruction message, wherein, the destination address of the instruction message is the network protocol (IP) address of the second connection established by the second communication module.

Alternatively, the first SIM card is a virtual SIM card; and the second SIM card is a virtual SIM card or a real SIM card.

With the embodiments of the present disclosure in which, after the first communication module establishes the first connection with the network, the second communication module receives, within the pre-determined time, the instruction message sent by the first communication module, the instruction message being used to instruct the second communication module to disconnect the second connection established with the network, the first communication module being connected with the first subscriber identity module (SIM) card in the terminal, and the second communication module being connected with the second SIM card in the terminal, the problem in the related art that during the establishment of a virtual SIM card network connection, the connection cannot be established, or data communication cannot be performed after the connection has been established, is solved, achieving the automatic verification of the connection availability of the virtual SIM card, without the need of manual involvement of a user, and improving user experience.

This section provides a summary of various implementations or examples of the technology described in the disclosure, and is not a comprehensive disclosure of the full scope or all features of the disclosed technology.

BRIEF DESCRIPTION OF THE DRAWINGS

The drawings described herein are used to provide a further understanding of the present disclosure and constitute a part of the present application. The schematic embodiments and the descriptions of the present disclosure are used to explain the present disclosure, and do not constitute improper limitations to the present disclosure. In the drawings.

DETAILED DESCRIPTION

Hereinafter, the present disclosure will be described in detail with reference to the accompanying drawings in combination with embodiments. It should be noted that, in the case of no conflict, the embodiments in the present disclosure and the features in the embodiments may be combined with each other.

Figure 1:
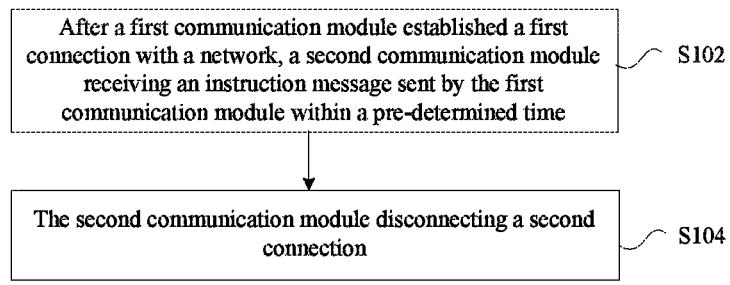
FIG. 1 is a flowchart of a method for processing a network connection according to an embodiment of the present disclosure.

In the embodiments, there is provided a method for processing a network connection. FIG. 1 is a flowchart of a method for processing a network connection according to the embodiment of the present disclosure. As shown in FIG. 1, the process comprises the following steps:

Step S102: after a first communication module establishes a first connection with a network, a second communication module receives, within a pre-determined time, an instruction message sent by the first communication module, wherein the instruction message is used to instruct the second communication module to disconnect a second connection established with the network, the first communication module is connected to a first subscriber identity module (SIM) card in a terminal and the second communication module is connected to a second SIM card in the terminal.

Step S104: the second communication module disconnects the second connection.

With the steps described above, after the first communication module establishes the connection with the network, if the second communication module disconnects the second connection only after receiving, within a pre-determined time, the instruction message sent by the first communication module which instructs the second communication module to disconnect the second connection established with the network, as compared to the related art in which the connection established by using the second communication module is disconnected after the first communication module information is acquired, or the connection established by using the second communication module is disconnected after the IP address assigned by the network is acquired by dialing by using the first communication module, which does not consider abnormalities that may occur during the connection establishment process of the first communication module, the steps described above solve the problem in the related art that during the network connection establishment process of the first communication module, the connection cannot be established, or data communication cannot be performed after the connection has been established, achieving the automatic verification of the connection availability of the first communication module, without the need of manual involvement of a user, and improving user experience. The step S104 described above relates to the second communication module receiving within a pre-determined time the instruction message sent by the first communication module. It should be noted that the second communication module may receive the instruction information in multiple manners, which will be illustrated below by way of example.

In an alternative embodiment, the second communication module receives, within the pre-determined time, the instruction message via the first connection and the second connection sequentially. In order that the virtual SIM described above may correctly send the instruction message to the second communication module described above, in an alternative embodiment, the instruction message carries the destination address of the instruction message, wherein the destination address of the instruction message is the network protocol (IP) address of the second connection established by the second communication module.

In an alternative embodiment, the second communication module not receiving within the pre-determined time the instruction message sent by the first communication module, illustrates that the data connection of the first communication module has not been properly established or the data path does not work after the connection has been established, whereby the second communication module maintains the second connection and does not disconnect the second connection.

In an alternative embodiment, the first SIM card is a virtual SIM card; and the second SIM card is a virtual SIM card or a real SIM card.

In the embodiments, there is further provided an apparatus for processing a network connection, for implementing the foregoing embodiments and preferred embodiments, details of which will not be repeated again. As used below, the term "module" may be a combination of software and/or hardware that achieves a pre-determined function. Although the apparatus described in the following embodiments is implemented preferably by software, the implementation of hardware or a combination of software and hardware is also possible and contemplated.

Figure 2:
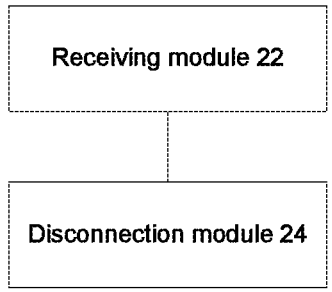
FIG. 2 is a structural block diagram of an apparatus for processing a network connection according to an embodiment of the present disclosure.

FIG. 2 is a structural block diagram of an apparatus for processing a network connection according to an embodiment of the present disclosure, which is applied to a second communication module. As shown in FIG. 2, the apparatus comprises: a receiving module 22 configured to receive, within a pre-determined time, after a first communication module establishes a first connection with a network, an instruction message sent by the first communication module, wherein the instruction message is used to instruct the second communication module to disconnect a second connection established with the network, the first communication module is connected to a first subscriber identity module (SIM) card in a terminal, and the second communication module is connected to a second SIM card in the terminal; and a disconnecting module 24 configured to disconnect the second connection.

Alternatively, the receiving module 22 is further configured to receive, within a pre-determined time, the instruction message via the first connection and the second connection sequentially.

Alternatively, the instruction message carries the destination address of the instruction message, wherein the destination address of the instruction message is the network protocol (IP) address of the second connection established by the second communication module.

In an alternative embodiment, the first SIM card is a virtual SIM card; and the second SIM card is a virtual SIM card or a real SIM card.

Figure 3:
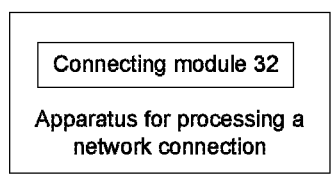
FIG. 3 is a structural block diagram (I) of an apparatus for processing a network connection according to an embodiment of the present disclosure.

FIG. 3 is a structural block diagram (I) of an apparatus for processing a network connection according to an embodiment of the present disclosure. As shown in FIG. 3, the apparatus further comprises: a connecting module 32 configured to maintain the second connection if the instruction message sent by the first communication module has not been received within the pre-determined time.

Figure 4:
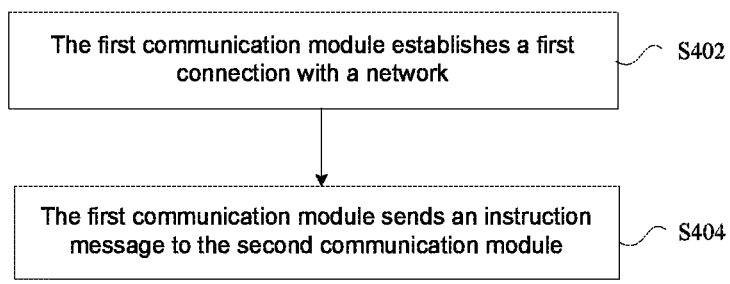
FIG. 4 is a flowchart (I) of a method for processing a network connection according to an embodiment of the present disclosure.

In another embodiment, there is provided another method for processing a network connection. FIG. 4 is a flowchart (I) of a method for processing a network connection according to an embodiment of the present disclosure. As shown in FIG. 4, the process comprises the following steps:

Step S402: the first communication module establishes a first connection with the network.

Step S404: the first communication module sends an instruction message to the second communication module, wherein the instruction message is used to instruct the second communication module to disconnect the second connection established with the network, the first communication module is connected to a first subscriber identity module (SIM) card in a terminal, and the second communication module is connected to a second SIM card in the terminal.

With the steps described above, after the first communication module establishes the first connection with the network, the second communication module disconnects the second connection only after the instruction message which instructs the second communication module to disconnect the second connection established with the network has been sent to the second communication module, as compared to the related art in which the connection established by using the second communication module is disconnected after the first communication module information is acquired, or the connection established by using the second communication module is disconnected after the IP address assigned by the network is acquired by dialing by using the first communication module, which does not consider abnormalities that may occur during the connection establishment process of the first communication module, the steps described above solve the problem in the related art that during the network connection establishment process of the first communication module, the connection cannot be established, or data communication cannot be performed after the connection has been established, achieving the automatic verification of the connection availability of the virtual SIM card, without the need of manual involvement of a user, and improving user experience.

The step S404 described above relates to the first communication module sending the instruction message to the second communication module. In an alternative embodiment, the first communication module sends the instruction message to the second communication module via the first connection and the second connection sequentially. In another alternative embodiment, the instruction message carries the destination address of the instruction message, wherein the destination address of the instruction message is the network protocol (IP) address of the second connection established by the second communication module.

The first SIM card is a virtual SIM card; and the second SIM card is a virtual SIM card or a real SIM card.

In the embodiments, there is further provided an apparatus for processing a network connection, which is used to implement the foregoing embodiments and preferred embodiments, and details which have been described will not be repeated again. As used below, the term "module" may be a combination of software and/or hardware that achieves a pre-determined function. Although the apparatus described in the following embodiments is preferably implemented by software, the implementation of hardware or a combination of software and hardware is also possible and contemplated.

Figure 5:
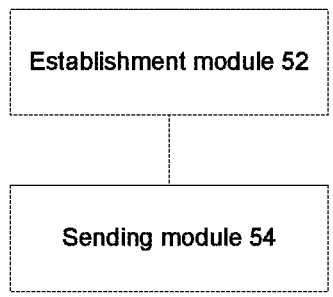
FIG. 5 is a structural block diagram (II) of an apparatus for processing a network connection according to an embodiment of the present disclosure.

FIG. 5 is a structural block diagram (II) of an apparatus for processing a network connection according to an embodiment of the present disclosure, applied to the first communication module. As shown in FIG. 5, the apparatus comprises: an establishment module 52 configured to establish a first connection with a network; a sending module 54 configured to send an instruction message to a second communication module, wherein the instruction message is used to instruct the second communication module to disconnect a second connection established with the network, the first communication module is connected to a first subscriber identity module (SIM) card in a terminal, and the second communication module is connected to a second SIM card in the terminal.

Alternatively, the sending module 54 is further configured to send the instruction message to the second communication module via the first connection and the second connection sequentially.

Alternatively, the instruction message carries the destination address of the instruction message, wherein the destination address of the instruction message is the network protocol (IP) address of the second connection established by the second communication module.

The first SIM card is a virtual SIM card; and the second SIM card is a virtual SIM card or a real SIM card.

It should be noted that, each of the foregoing modules may be implemented by software or hardware, and the latter may be implemented in the following manner, but not limited thereto: all the foregoing modules are located in the same processor; or the foregoing modules are respectively located in the first processor, the second processor or the third processor . . . .

In view of the problems in the related technical solution that no detection is performed on the virtual SIM card connection establishment and that the delay is increased due to the repetitive disconnection and networking operations of the connection using the real SIM card, in the present alternative embodiment, the operation of disconnecting the real SIM card connection is delayed to be performed after the virtual SIM card connection has been established, and a disconnection instruction message is sent from the connection established by the virtual SIM card to the connection established by the real SIM card, through the network. The real SIM card connection cannot be disconnected until the disconnection instruction message has been received. If the message has not been received, there is no need to disconnect the real SIM card connection, and the next available virtual SIM card information is acquired directly through the connection.

Figure 6:
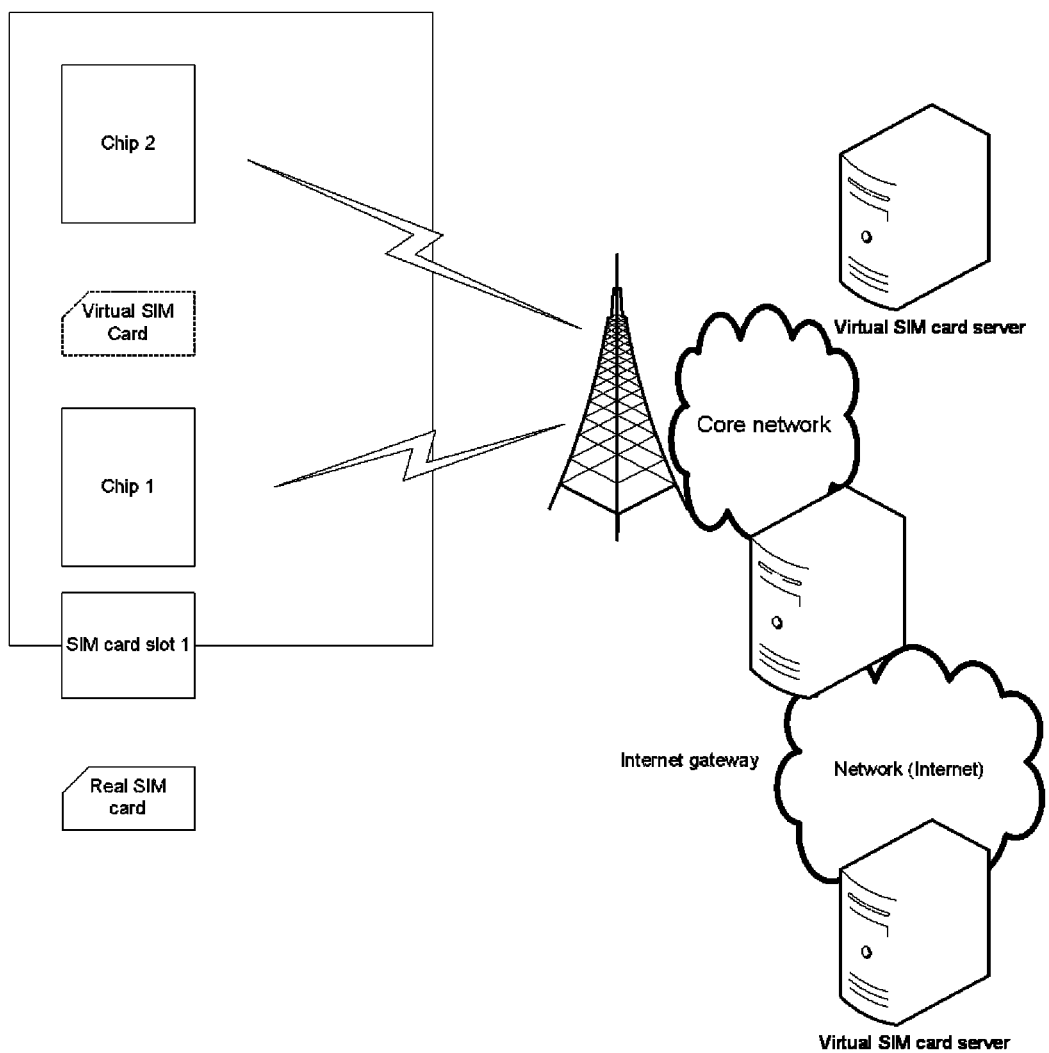
FIG. 6 is a diagram of terminal modules and network architecture of a method for managing a data connection for a virtual SIM card product adopting a dual-chip solution in the related art.

FIG. 6 is a diagram of terminal modules and network architecture of a method for managing a data connection for a virtual SIM card product adopting a dual-chip solution in the related art, wherein the present disclosure is described by taking two chips which act as two communication modules as an example, wherein the first chip 1 is the second communication module, and the chip 2 is the first communication module. As shown in FIG. 6, there are two chips, chip 1 and chip 2, in the terminal. The chip 1 is directly connected to the real SIM card through the SIM card slot 1, to complete subsequent network access functions; and the chip 2 uses the virtual SIM card information acquired from the network to complete subsequent network access functions. There is an available virtual SIM card server in the network, which provides proper virtual SIM card information to valid terminals accessing the server. The virtual SIM card server may be located in the operator's internal network, and may also be located in the Internet, whereas the specific deployment location of the server does not affect the realization of the solution.

Figure 7:
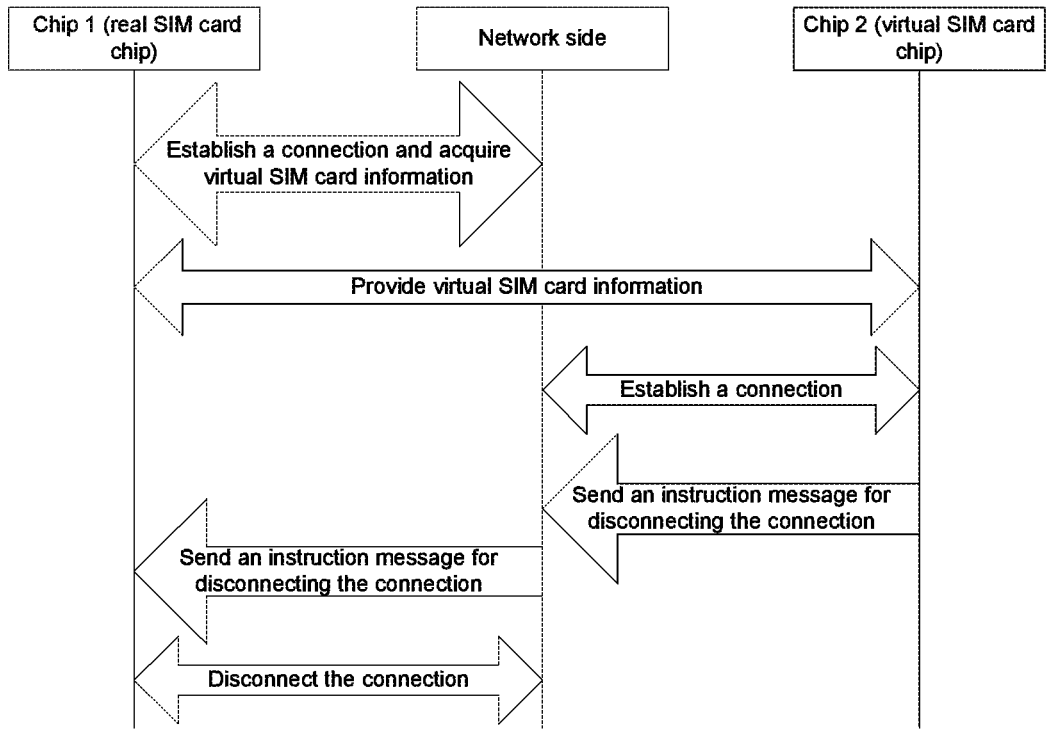
FIG. 7 is a flowchart of a network access according to an embodiment of the present disclosure.
Figure 8:
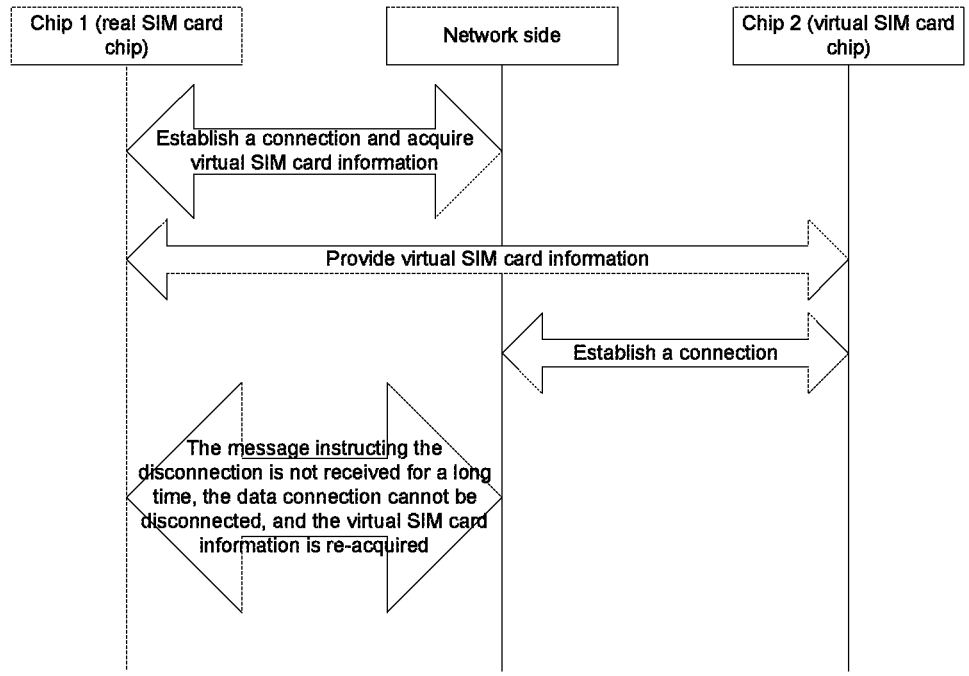
FIG. 8 is a flowchart (I) of a network access according to an embodiment of the present disclosure.

The process of the terminal accessing the network in the alternative embodiment is shown in FIG. 7 and FIG. 8. FIG. 7 is a flowchart of normal completion, and FIG. 8 is an abnormality processing process when the connection established by the chip 2 accessing the network by using the virtual SIM card information is problematic and data is unavailable. The processes of FIG. 7 and FIG. 8 will be described below in details.

As shown in the flowchart in FIG. 7, after being powered on, the terminal uses the chip 1 to read the related information of the real SIM card inserted into the SIM card slot 1, and uses this information to complete the network registration and the data connection establishment. Thereafter, the terminal uses the data connection to access the virtual SIM card server and acquire suitable virtual SIM card information. The address of the virtual SIM card server can be pre-configured before the terminal comes out of the factory or may be queried and acquired after the terminal has been successfully connected to the network through the connection established by the chip 1. The specific way does not affect the realization of this solution. The terminal may provide the virtual SIM card server with necessary information in order to acquire suitable virtual SIM card information. The virtual SIM card server may determine independently, according to the information fed back by the terminal or not according to the information fed back by the terminal, suitable virtual SIM card information and feed it back to the terminal.

After the terminal acquires the suitable virtual SIM card information through the data path of the chip 1, the terminal provides the virtual SIM card information to the chip 2. The information provided by the method is transmitted through the path between the two chips inside the terminal. The communication method between the two chips provided by the terminal may be in various forms of physical connections, such as by means of various standard communication interfaces or self-defined communication interfaces, and the specific forms may change. The method is used to provide the path for data communication between the chip 1 and the chip 2.

The chip 2 uses the virtual SIM card information to complete the network registration and data connection establishment processes. The chip 2 uses the virtual SIM card information, and may register with the same cell or different cells as the data connection of the chip 1, or access different operators' network. Here, the differences do not affect the realization of this solution. The chip 2 uses the virtual SIM card information to complete the network registration process. Some data needs or does not need to be transmitted through the data connection that the chip 1 has already established.

After the connection has been established, the chip 2, sends on the established connection, instruction information for disconnecting the connection, and the destination address thereof is the IP address of the data connection established by the chip 1. The instruction information is sent directly to the network so as to be sent to the chip 1 without passing through the data path between the chip 1 and the chip 2 in the terminal.

After receiving the instruction information for disconnecting the connection sent by the chip 2, the network determines that the destination IP address of the information is the IP address acquired through the data connection established by the chip 1. After routing the information, the network sends the information to the chip 1 through the data connection established by the chip 1 by using a suitable path. The delivery process may be implemented in the same operator's core network by means of routing transits, and may also be implemented through multiple routing in the internet.

After the chip 1 provides the virtual SIM card information to the chip 2, if the chip 1 receives instruction information for disconnecting the connection sent by the chip 2 within a preset expiration period, it illustrates that the data connection of the chip 2 has been established properly, that the data path works, and that data transmission can be performed properly. The data connection of the chip 1 can be disconnected at this moment. Subsequently, chip 1 initiates the process of disconnecting the connection with the network.

As shown in the flowchart of FIG. 8, after the virtual SIM card information has been provided to the chip 2, if the chip 1 does not receive instruction information for disconnecting the connection sent by the chip 2 within a preset expiration period, it illustrates that the data connection of the chip 2 has not been established properly, or the data path does not work after having been established. At this moment, the data connection of chip 1 cannot be disconnected, and the chip 1 needs to use this data path to re-access the virtual SIM card server and obtain new suitable SIM card information.

After acquiring the new suitable SIM card information, it re-sends same to the chip 2, and continues to determine whether the instruction information for disconnecting the connection sent by the chip 2 can be received within a pre-determined time so as to perform the corresponding operation.

After the network connection has been established, if the chip 2 has sent instruction information for disconnecting the connection to the chip 1 through the network and then receives the new virtual SIM card information resent by the chip 1, it illustrates that the chip 1 fails to properly receive the instruction information for disconnecting the connection sent by the chip 2 earlier. At the time, the chip 2 should disconnect the previously established connection, replace the previously used virtual SIM card information with the newly received virtual SIM card information, and re-register and establish a connection with the network.

In another alternative embodiment, data may be directly transmitted, without using the data connection of the chip 2 or the data connection of the chip 1, and it can be determined whether the data path of the chip 2 works properly from the way in which the chip 2 performs data communication with the network (for example, pinging a certain web site and determining whether a ping reply packet can be received). If the data path works properly, the chip 1 can be informed to disconnect the data connection which uses the real SIM card, by means of the communication channel between the chips inside the terminal.

In another alternative embodiment, the chip 1 may also be informed, through the communication path between the chips within the terminal, of the IP address of the data connection established by the chip 2 by using the virtual SIM card. The chip 1 initiates data communication with the chip 2 through the network (such as by ping operation) to determine whether the data path of the chip 2 works properly. If the chip 1 receives data from the chip 2 through the network, the data connection established by the chip 1 using the real SIM card can be disconnected.

The chip 1 and the chip 2 mentioned in the present alternative embodiment refer to logical entities that can acquire SIM card information and interact with the network, however, the chip 1 and the chip 2 are not limited to two physically different chips in terms of physical position. These two logical entities may also be physically located in the same physical chip. The functions of the two logical chips are implemented by software or hardware, that is, they acquire the information of each SIM card respectively and complete the interaction with the network. Such implementation shall also be included in the solution.

The chip 1 described in the present alternative embodiment is directly connected to the real SIM card through the SIM card slot 1, which is merely an implementation example, without the purpose of limiting the SIM card connected with the chip 1 only to be a real SIM card. If the SIM card 1 is in the form of a virtual SIM card, the chip 1 uses the related information of the SIM card 1 of the virtual SIM card to complete all the interactions with the network, such as dial-up access, which shall also be included in the solution.

In summary, the method for managing the data connection of a virtual SIM card product adopting a dual-chip solution provided in the embodiment of the present disclosure can automatically determine the validity of the virtual SIM card connection without the need of user involvement, and is convenient for the user to use, reducing repetitive disconnection and real SIM card connection establishment processes, thereby reducing time overheads and improving user experience.

In another embodiment, there is further provided software for executing the technical solutions described in the above-mentioned embodiments and preferred embodiments.

In another embodiment, there is further provided a storage medium having the foregoing software stored therein, comprising but not limited to an optical disk, a floppy disk, a hard disk, a rewritable memory, and the like.

Obviously, those skilled in the art should understand that each module or each step of the present disclosure described above can be implemented by common computing devices, which can be centralized on a single computing device or distributed on a network formed by multiple computing devices, which may alternatively be implemented with program codes executable to a computing device so that they may be stored in a storage device for execution by a computing device and in some cases may execute the steps shown or described in an order different than described, or they are respectively made as individual integrated circuit modules, or a plurality of modules or steps among them are made as a single integrated circuit module. As such, the present disclosure is not limited to any specific combination of hardware and software.

The foregoing description is merely about the preferred embodiments of the present disclosure and is not intended to limit the present disclosure. For those skilled in the art, the present disclosure may have various modifications and changes. Any modification, equivalent replacement, improvement, etc. within the spirit and principle of the present disclosure should be encompassed in the protection scope of the present disclosure.

INDUSTRIAL APPLICABILITY

With the embodiments of the present disclosure in which, after the first communication module establishes the first connection with the network, the second communication module receives, within the pre-determined time, the instruction message sent by the first communication module, wherein the instruction message is used to instruct the second communication module to disconnect the second connection established with the network, the first communication module being connected with the first subscriber identity module (SIM) card in the terminal and the second communication module being connected with the second SIM card in the terminal, the problem in the related art that during the establishment of a virtual SIM card network connection, the connection cannot be established, or data communication cannot be performed after the connection has been established, is solved, achieving the automatic verification of the connection availability of the virtual SIM card, without the need of manual involvement of a user, and improving user experience.

What is claimed is:

1. A method for processing a network connection, comprising:
after a first communication module establishes a first connection with a network, a second communication module receiving, within a pre-determined time, an instruction message sent by the first communication module and arrived after being transmitted via the first connection and a second connection established between the second communication module and the network sequentially, wherein the instruction message is used to instruct the second communication module to disconnect the second connection established with the network; the first communication module being connected to a first subscriber identity module (SIM) card in a terminal, and the second communication module being connected to a second SIM card in the terminal; and
after receiving, within the pre-determined time, the instruction message sent by the first communication module and arrived after being transmitted via the first connection and the second connection established between the second communication module and the network sequentially, the second communication module disconnecting the second connection.

2. The method according to claim 1, wherein the instruction message carries the destination address of the instruction message and the destination address of the instruction message is an Internet Protocol (IP) address of the second connection established by the second communication module.

3. The method according to claim 1, wherein, the method further comprises:
if the second communication module does not receive, within the pre-determined time, the instruction message sent by the first communication module, the second communication module maintaining the second connection.

4. The method according to claim 1, wherein the first SIM card is a virtual SIM card, and the second SIM card is a virtual SIM card or a real SIM card.

5. A method for processing a network connection, comprising:
a first communication module establishing a first connection with a network;
the first communication module sending an instruction message to a second communication module, wherein the instruction message is transmitted via the first connection and a second connection established between the second communication module and the network sequentially, and the instruction message is used to instruct the second communication module to disconnect the second connection established with the network, the first communication module is connected to a first subscriber identity module (SIM) card in a terminal, and the second communication module is connected to a second SIM card in the terminal.

6. The method according to claim 5, wherein the instruction message carries the destination address of the instruction message, wherein the destination address of the instruction message is an Internet Protocol (IP) address of the second connection established by the second communication module.

7. The method according to claim 5, wherein, the first SIM card is a virtual SIM card, and the second SIM card is a virtual SIM card or a real SIM card.

8. An apparatus for processing a network connection, comprising:
a processor; and
a memory for storing instructions executable by the processor;
wherein the processor is configured to:
receive, within a pre-determined time, after a first communication module establishes a first connection with a network, an instruction message sent by the first communication module and arrived after being transmitted via the first connection and a second connection established between the second communication module and the network sequentially, wherein the instruction message is used to instruct the second communication module to disconnect the second connection established with the network; the first communication module being connected to a first subscriber identity module (SIM) card in a terminal, and the second communication module being connected to a second SIM card in the terminal; and after receive, within the pre-determined time, the instruction message sent by the first communication module and arrived after being transmitted via the first connection and the second connection established between the second communication module and the network sequentially, disconnect the second connection.

9. The apparatus according to claim 8, wherein the instruction message carries the destination address of the instruction message and the destination address of the instruction message is an Internet Protocol (IP) address of the second connection established by the second communication module.

10. The apparatus according to claim 8, wherein the processor is further configured to:

maintain the second connection if the instruction message sent by the first communication module has not been received within the pre-determined time.

11. The apparatus according to claim 8, wherein the first SIM card is a virtual SIM card, and the second SIM card is a virtual SIM card or a real SIM card.

12. An apparatus for processing a network connection, comprising:

a processor; and
a memory for storing instructions executable by the processor;
wherein the processor is configured to:
establish a first connection with a network;
send an instruction message to a second communication module, wherein the instruction message is transmitted via the first connection and a second connection established between the second communication module and the network sequentially, and the instruction message is used to instruct the second communication module to disconnect the second connection established with the network, the first communication module is connected to a first subscriber identity module (SIM) card in a terminal, and the second communication module is connected to a second SIM card in the terminal.

13. The apparatus according to claim 12, wherein the instruction message carries the destination address of the instruction message and the destination address of the instruction message is an Internet Protocol (IP) address of the second connection established by the second communication module.

14. The apparatus according to claim 12, wherein the first SIM card is a virtual SIM card, and the second SIM card is a virtual SIM card or a real SIM card.

* * * * *